United States Patent [19]

Kawakami et al.

[11] Patent Number: 4,594,404

[45] Date of Patent: Jun. 10, 1986

[54] POLYCARBONATES HAVING IMPROVED HYDROLYTIC STABILITY

[75] Inventors: James H. Kawakami; James E. Harris, both of Piscataway; Louis M. Maresca, Belle Mead; Lloyd M. Robeson, Whitehouse Station; Robert J. Cotter, Bernardsville, all of N.J.

[73] Assignee: Union Carbide Corporation, Danbury, Conn.

[21] Appl. No.: 591,539

[22] Filed: Mar. 20, 1984

[51] Int. Cl.$^4$ ............................................. C08G 63/62
[52] U.S. Cl. .................................... 528/174; 524/425; 524/426; 524/444; 524/445; 524/451; 524/611; 525/433; 525/462; 525/467; 525/468; 525/469; 528/125; 528/126; 528/128; 528/370; 528/371; 528/372
[58] Field of Search ............... 528/125, 126, 128, 174, 528/370, 371, 372

[56] References Cited

U.S. PATENT DOCUMENTS

| | | |
|---|---|---|
| 2,964,794 | 12/1960 | Peilstockev et al. ............... 528/174 |
| 2,991,273 | 7/1961 | Hechelhammer et al. ......... 528/174 |
| 3,030,331 | 4/1962 | Goldberg ............................ 528/174 |
| 3,269,986 | 8/1966 | Goldberg ............................ 528/174 |
| 3,737,409 | 6/1973 | Fox ..................................... 528/174 |
| 3,879,347 | 4/1975 | Serini et al. ........................ 528/174 |
| 4,009,148 | 2/1977 | Neuray et al. ..................... 528/174 |
| 4,195,157 | 3/1980 | Mark ................................... 528/174 |
| 4,404,351 | 9/1983 | Kafer et al. ........................ 528/174 |

*Primary Examiner*—Lester L. Lee
*Attorney, Agent, or Firm*—Donald M. Papuga

[57] ABSTRACT

This invention relates to moldable polycarbonate compositions and in particular to moldable polycarbonates which have ordered alternating repeating units derived from bis-(3,5-dimethyl-4-hydroxyphenyl)sulfone (TMBS) and 2,2-bis-(4-hydroxyphenyl)propane (Bisphenol A) dihaloformate, or ordered, alternating repeating units derived from bis-(3,5-dimethyl-4-hydroxyphenyl) sulfone (TMBS) dihaloformate and a bisphenol compound such as 2,2-bis-(4-hydroxyphenyl)propane (Bisphenol A). Such polycarbonates exhibit improved hydrolytic stability and also excellent processability in molding applications.

16 Claims, No Drawings

POLYCARBONATES HAVING IMPROVED HYDROLYTIC STABILITY

BRIEF SUMMARY OF THE INVENTION

1. Technical Field

This invention relates in general to moldable polycarbonate compositions and in particular to moldable polycarbonates which have ordered, alternating repeating units derived from bis-(3,5-dimethyl-4-hydroxyphenyl)-sulfone (TMBS) and a bisphenol compound such as 2,2-bis-(4-hydroxyphenyl)propane (Bisphenol A). Such polycarbonates exhibit improved hydrolytic stability and also excellent processability in molding applications.

It has been found as a result of this invention that polycarbonates which contain ordered, alternating carbonate units derived from TMBS and a bisphenol compound such as Bisphenol A exhibit improved hyrolytic stability over that shown by polycarbonates having a random, statistical arrangement of similar carbonate repeating units prepared by phosgenation processes known in the art. Such improved hydrolytic stability is attributable to the ordered arrangement of repeating units derived from TMBS in the polymer chain and, in particular, to the molecular configuration of repeating units derived from TMBS in which the four methyl groups attached to the aromatic rings of TMBS act to sterically hinder hydrolytic attack against the carbonyl-ether oxygen linkages vicinally positioned in the polymer chain.

In addition to improved hydrolytic stability, the polycarbonates of this invention having ordered, alternating carbonate units derived from TMBS and a bisphenol compound such as Bisphenol A exhibit excellent processability in molding applications. The polycarbonates of this invention therefore exhibit a highly desirable combination of properties not afforded by polycarbonates having a random, statistical arrangement of similar carbonate repeating units prepared by phosgenation processes known in the art.

BACKGROUND OF THE INVENTION

Polycarbonates in general are derived from the random, statistical reaction of one or more dihydric phenols and a carbonate precursor, particularly phosgene. Such polycarbonates are high temperature, high performance thermoplastic polymers with a good combination of thermal and mechanical properties. Polycarbonates also have good processability which allows them to be molded into a variety of articles.

However, when such polycarbonates are exposed to a hydrolytic environment under excessive time and/or temperature conditions, the hydrolytic stability of the polycarbonates is generally poor which results in poor mechanical properties. Poor hydrolytic stability is reflected by a rapid decrease in reduced viscosity of the polycarbonates resulting from exposure to the hydrolytic environment. This deficiency also requires careful drying procedures of the polycarbonates prior to melt processing.

Bis-(3,5-dimethyl-4-hydroxyphenyl)sulfone (TMBS) and 2,2-bis-(4-hydroxyphenyl) propane (Bisphenol A) have been variously described for use in making polycarbonate resins. U.S. Pat. No. 3,737,409 describes a random, non-ordered copolymer of the reaction product of TMBS, Bisphenol A and a carbonate precursor such as phosgene wherein the bisphenol reaction mixture of TMBS and Bisphenol A is comprised of 40-99 weight percent of TMBS and a corresponding 60-1 weight percent of Bisphenol A. The claims of the patent are directed to a copolymer as above described except that amount of TMBS used in the copolymer is 50-99 weight percent (and 50- 1 weight percent of Bisphenol A based on the total weight of TMBS and Bisphenol A). Such proportions of these monomers in the manufacture of the polymer are urged by the patentee to enhance the hydrolytic stability of the resultant polycarbonate.

European Patent Publication No. 0,000,547 published July 2, 1979, discloses that random, non-ordered copolycarbonates of an aromatic diphenol (e.g. Bisphenol A), an aromatic sulfonyl diphenol (e.g. bis-(alkylsubstituted-4-hydroxyphenyl) sulfone) and a carbonate precursor such as phosgene exhibit improved heat deflection temperatures when the amount of sulfonyl diphenol is from 1% to 50% by weight of total diphenol and said sulfonyl diphenol is at least 99% pure 4—4' isomer by weight of total sulfonyl diphenol.

There is described by Serini in *Angewandte Makrom. Chemie.* 55 (1976) pages 175–189 (Number 855) the manufacture of high molecular weight random, non-ordered polycarbonates by interfacial polycondensation of o, o, o', o'-tetramethylsubstituted bisphenols and phosgene. According to the reference, the synthesis of these polycarbonates requires the use of high concentrations of catalyst, high pH values, excess amounts of phosgene and a long condensation period. The polycarbonates are characterized by high second order transition temperatures, excellent hydrolytic stability, lower refractive indices and good thermoplastic processability. However, at page 182, the authors state that a polycarbonate based on bis-(3,5-dimethyl-4-hydroxyphenyl)sulfone is not melt stable.

Copending U.S. patent application Ser. No. 485,945, filed Apr. 18, 1983, is primarily directed to improved random, non-ordered polycarbonates comprising from about 20 weight percent to about 95 weight percent of repeating units (I) having the formula

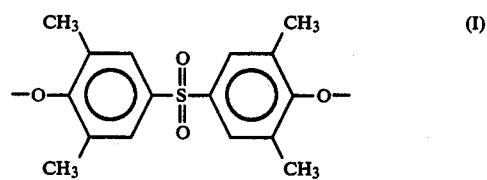

and from about 5 weight percent to about 80 weight percent of repeating units (II) having the formula

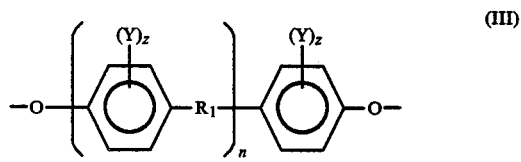

in which the repeating units (I) and the repeating units (II) are connected by interbonding units (III) having the formula

wherein Y is selected from alkyl groups of 1 to 4 carbon atoms, chlorine or bromine, each z, independently, has a value of from 0 to 4 inclusive, n has a value of 0 or 1, and $R_1$ is a divalent saturated or unsaturated aliphatic hydrocarbon radical, O, CO, $SO_2$, S or a direct bond, with the proviso that when $R_1$ is $SO_2$ then repeating unit (II) is not the same as repeating unit (I) and wherein terminal units in the polycarbonate are bonded to repeating units (II). The invention is also directed to a phosgenation process for preparing the improved polycarbonates.

In general, polycarbonates prepared by phosgenation processes exhibit a random, statistical arrangement of repeating units in the polymer chain rather than an ordered, nonstatistical arrangement. It has been found as a result of this invention that polycarbonates which contain ordered, alternating carbonate units derived from bis-(3,5-dimethyl-4-hydroxyphenyl)sulfone (TMBS) and a bisphenol compound such as 2,2-bis-(4-hydroxyphenyl)propane (Bisphenol A) exhibit improved hydrolytic stability over that shown by the above cited prior art. Such improved hydrolytic stability is attributable to the ordered arrangement of repeating units derived from TMBS in the polymer chain and in particular, to the molecular configuration of repeating units derived from TMBS in which the four methyl groups attached to the aromatic rings of TMBS act to sterically hinder hydrolytic attack against the carbonyl-ether oxygen linkages vicinally positioned in the polymer chain.

In addition to improved hydrolytic stability, the polycarbonates of this invention having ordered, alternating carbonate units derived from TMBS and a bisphenol compound such as Bisphenol A exhibit excellent processability in molding applications. The polycarbonates of this invention therefore exhibit a highly desirable combination of properties not afforded by polycarbonates having a random, statistical arrangement of similar carbonate repeating units prepared by phosgenation processes known in the art.

DISCLOSURE OF THE INVENTION

This invention relates to moldable polycarbonate compositions which exhibit improved hydrolytic stability and also excellent processability in molding applications. In particular, this invention relates to a composition comprising a polycarbonate containing ordered, alternating repeating units having the formula

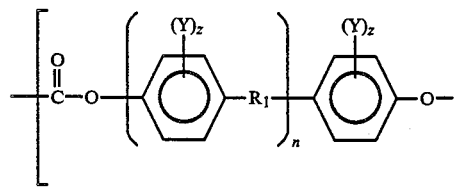

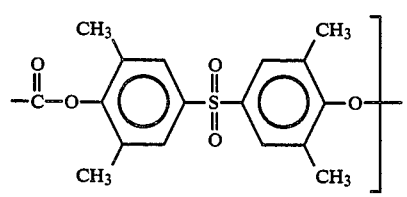

in an amount sufficient to enhance hydrolytic stability of the polycarbonate, wherein Y is selected from alkyl groups of 1 to 4 carbon atoms, chlorine or bromine, each z, independently, has a value of from 0 to 4 inclusive, n has a value of 0 or 1, $R_1$ is a divalent saturated or unsaturated hydrocarbon radical, particularly an alkylene or alkylidene radical having from 1 to 6 carbon atoms or a cycloalkylene or cycloalkylidene radical having up to and including 9 carbon atoms, O, CO, $SO_2$, S or a direct bond, with the proviso that when $R_1$ is $SO_2$ then the subunit having the formula

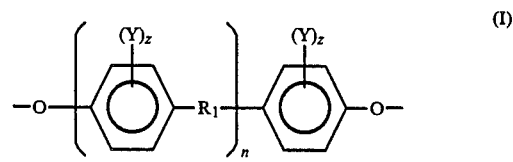

is not the same as the subunit having the formula

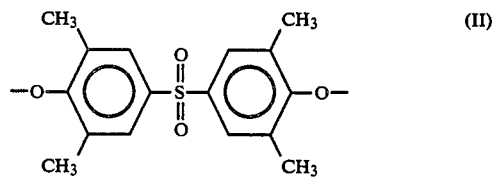

wherein the polycarbonate has a reduced viscosity of at least about 0.3 dl/g as measured in chloroform at a concentration of 0.5 g/100 ml at 25° C.

This invention further relates to a process for preparing polycarbonates comprising ordered, alternating repeating units having the formula

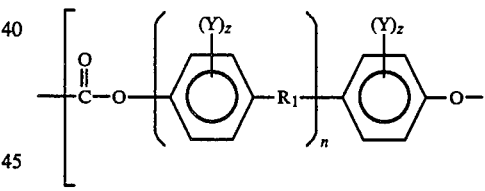

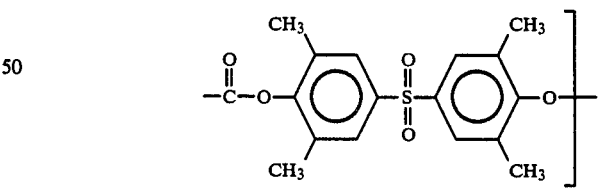

in an amount sufficient to enhance hydrolytic stability of the polycarbonate, wherein Y is selected from alkyl groups of 1 to 4 carbon atoms, chlorine or bromine, each z, independently, has a value of from 0 to 4 inclusive, n has a value of 0 or 1, $R_1$ is a divalent saturated or unsaturated hydrocarbon radical, particularly an alkylene or alkylidene radical having from 1 to 6 carbon atoms or a cycloalkylene or cycloalkylidene radical having up to and including 9 carbon atoms, O, CO, $SO_2$, S or a direct bond, with the proviso that when $R_1$ is $SO_2$ then the subunit having the formula

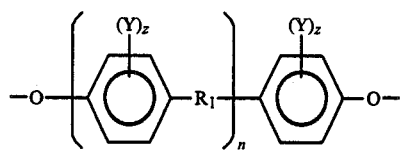

(I)

is not the same as the subunit having the formula

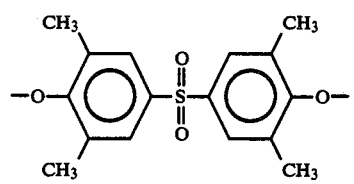

(II)

and wherein the polycarbonate has a reduced viscosity of at least about 0.3 dl/g as measured in chloroform at a concentration of 0.5 g/100 ml at 25° C., which process comprises reacting a compound having the formula

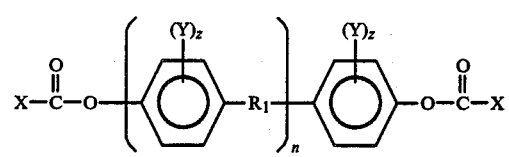

(III)

wherein Y, z, n and $R_1$ are as defined above and X is halogen, and a bisphenol compound having the formula

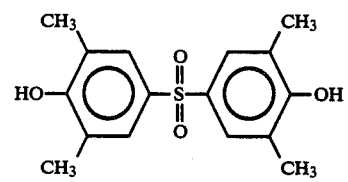

(IV)

in amounts sufficient to form the polycarbonate.

This invention yet further relates to a process for preparing polycarbonates comprising ordered, alternating repeating units having the formula

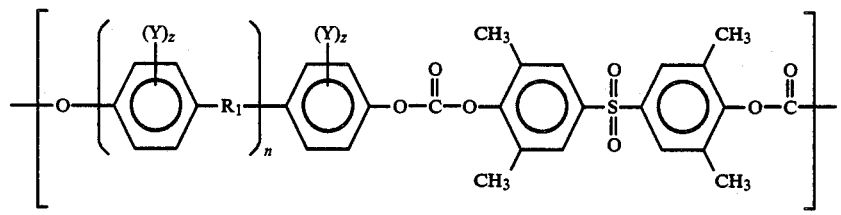

in an amount sufficient to enhance hydrolytic stability of the polycarbonate, wherein Y is selected from alkyl groups of 1 to 4 carbon atoms, chlorine or bromine, each z, independently, has a value of from 0 to 4 inclusive, n has a value of 0 or 1, $R_1$ is a divalent saturated or unsaturated hydrocarbon radical, particularly an alkylene or alkylidene radical having from 1 to 6 carbon atoms or a cycloalkylene or cycloalkylidene radical having up to and including 9 carbon atoms, O, CO, $SO_2$, S or a direct bond, with the proviso that when $R_1$ is $SO_2$ then the subunit having the formula

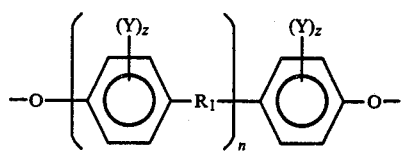

(I)

is not the same as the subunit having the formula

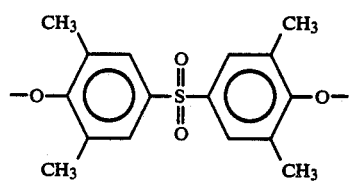

(II)

and wherein the polycarbonate has a reduced viscosity of at least about 0.3 dl/g as measured in chloroform at a concentration of 0.5 g/100 ml at 25° C., which process comprises reacting a compound having the formula

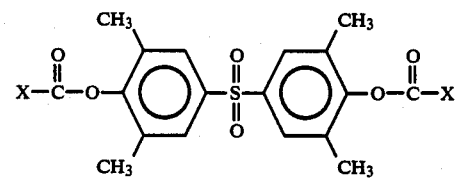

(V)

wherein X is halogen, and a bisphenol compound having the formula

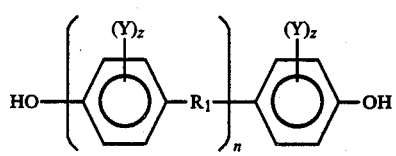

(VI)

wherein Y, z, n and $R_1$ are as defined above, in amounts sufficient to form the polycarbonate.

The improved hydrolytic stability exhibited by the polycarbonates of this invention can be attributable to the ordered, alternating repeating units described above in the polymer chain. The molecular configuration of subunit (II) above in the ordered, alternating repeating units is important in this regard. In particular, the four methyl groups attached to the aromatic rings of subunit (II) are believed to act to sterically hinder hydrolytic attack against the carbonyl-ether oxygen linkages vicinally positioned in the polymer chain. In the polycarbonates of this invention having the ordered, alternating repeating units described above, each carbonyl-ether oxygen linkage is vicinally positioned to a subunit (II) and therefore each such linkage is afforded steric hinderance protection against hydrolytic attack.

In contrast, carbonyl-ether oxygen linkages in vicinal positions to, for example, repeating units derived from Bisphenol A have no sterically hindering methyl groups, and such is believed to explain why such a polymer would be more susceptible to hydrolytic attack. Such polycarbonates having a random, statistical arrangement of Bisphenol A repeating units are prepared by phosgenation processes known in the art.

In addition to improved hydrolytic stability, the polycarbonates of this invention having ordered, alternating repeating units derived from TMBS and a bisphenol compound such as Bisphenol A exhibit excellent processability in molding applications. While polycarbonates having repeating units derived solely from TMBS may exhibit desirable hydrolytic stability and while polycarbonates having repeating units derived solely from Bisphenol A may exhibit desirable processability in molding applications, such polycarbonates do not exhibit the combination of these two highly desirable properties as afforded by the polycarbonates of this invention. In general, the polycarbonates of this invention containing a higher concentration of ordered, alternating repeating units described above will preferably have the better combination of properties, i.e., better hydrolytic stability and better processability.

DETAILED DESCRIPTION

The polycarbonates of this invention can be produced by either the conventional solution or interfacial processes known in the art for the manufacture of polycarbonates. The solution process involves reacting, for example, 2,2-bis-(4-hydroxyphenyl) propane (Bisphenol A) dichloroformate with bis-(3,5-dimethyl-4-hydroxyphenyl)sulfone (TMBS) or, in the alternative, 2,2-bis-(4-hydroxyphenyl) propane (Bisphenol A) with bis-(3,5-dimethyl-4-hydroxyphenyl) sulfone (TMBS) dichloroformate. The reaction medium may be a single organic phase employing a compatible solvent such as a halohydrocarbon, e.g., dichloromethane, and utilizing a base, such as pyridine, to accept the by-product hydrogen chloride. Alternatively, interfacial polymerization techniques may be employed wherein the reaction media is composed of an organic phase and an alkaline aqueous phase. A phase transfer catalyst, that is an acid acceptor, such as triethylamine may be used to accept the by-product hydrogen chloride from the condensation in the organic phase and to transfer the hydrogen chloride to the alkaline aqueous phase where it is neutralized and the catalyst is regenerated to its unprotonated form to accept additional hydrogen chloride. Additionally, chain length regulators such as para-tertiary-butyl phenol may be employed to limit the molecular weight and thus the viscosity of the polymer. Examples of the interfacial polymerization process are described in U.S. Pat. No. 3,646,402 issued Feb. 29, 1972 and by P. W. Morgan, Condensation polymers By Interfacial and Solution Methods (Interscience 1965).

The solution and interfacial polymerization techniques known in the art for the manufacture of polycarbonates can be applied equally in the practice of the instant invention, except as hereinafter modified.

The utilization of chain stoppers in the manufacture of polycarbonates is very well known in the art. Suitable chain stoppers include mono-functional carboxylic acids or hydroxy compounds such as phenol, para-tertiary butylphenol, benzoic acid, para-tertiary butylbenzoic acid, and the like. The choice of a chain stopper is not critical to the practice of the invention, any suitable mono-carboxylic acid or mono-hydroxy compound may be employed. The chain stopper unit, because it stops the growth of the polymer, becomes the terminal unit of the polycarbonate.

Any conventional organic solvent that will solvate the product polymer may be used in the process of the instant invention, so long as the solvent is chemically unreactive in the polycarbonate polymerization. A preferred group of solvents is the chlorinated aliphatic hydrocarbons of 1–4 carbons such as dichloromethane, chloroform, carbon tetrachloride, dichloroethane, trichloroethane, trichloroethylene, tetrachloroethylene, and mixtures thereof. Another desirable class of solvents is the optionally halogenated aromatic hydrocarbons such as monochlorobenzene, dichlorobenzene, and mixtures thereof. Preferred solvents are the chloromethanes and especially dichloromethane. The solvents used in a solution polymerization process are preferably water-free so as to avoid side reactions of the dihaloformate reactant described in formula (III) hereinabove and the dihaloformate reactant described in formula (V) hereinabove.

The acid acceptor employed can be either an organic or an inorganic acid acceptor. A suitable organic acid acceptor is pyridine or a tertiary amine which includes such materials as triethylamine, dimethylaniline, tributylamine, etc. The inorganic acid acceptor can be one which can be either a hydroxide, a carbonate, a bicarbonate, or a phosphate of an alkali or alkaline earth metal.

The interfacial process utilizes an organic phase and an aqueous phase. In carrying out the interfacial process, it is therefore important that the organic solvent chosen be immiscible with water. The quantity of organic solvent and the concentration of the reactants in the solvent are not critical except that sufficient solvent should be present to dissolve the product polymer and except that the organic phase dihaloformate reactant described in formula (III) hereinabove and the organic phase dihaloformate reactant described in formula (V) hereinabove should be present in an amount sufficient to form the polycarbonates of the present invention. An amount of dichloromethane sufficient to form a product polymer solution of about 20 weight percent polymer is generally the minimum amount of solvent for this particular system. The organic phase dihaloformate reactant described in formula (III) hereinabove and the organic phase dihaloformate reactant described in formula (V) hereinabove generally should be present in stoichiometric amounts with the aqueous phase bisphenol reactant described in formula (IV) hereinabove and the aqueous phase bisphenol reactant described in formula (VI) hereinabove respectively. Excess bisphenolates derived from the aqueous phase bisphenol reactants described in formulas (IV) and (VI) can be used if a carbonate forming reactant is added at the end of the initial reaction in concentrations sufficient to increase the molecular weight of the polymer. The carbonate forming reactant can be a carbonyl halide such as phosgene. Other materials such as chain length regulators, that is the chain stoppers, catalysts, foam depressants, and the like can also be present in the organic phase.

The aqueous phase is normally basic to the extent of a pH of at least about 8 and preferably at least about 9 prior to reaction. During reaction, the pH may vary within the range of about 7–12, but preferably is kept above 7 by the addition of base such as sodium hydroxide when needed.

The bisphenol reactants described in formula (IV) hereinabove and formula (VI) hereinabove, in an interfacial polymerization reaction, are provided in the aqueous phase and when neutralized with a base are referred to herein as bisphenolates. These reactants are normally formed by dissolving the bisphenols in water with an inorganic base, for example, an alkali or alkaline earth metal hydroxide, preferably an alkali metal hydroxide, and most preferably, sodium hydroxide. In the preferred embodiment, the sodium bisphenolate of bis-(3,5-dimethyl-4-hydroxyphenyl) sulfone (TMBS) and the sodium bisphenolate of 2,2-bis-(4-hydroxyphenyl)-propane (Bisphenol A) are utilized in the aqueous phase. The concentrations of the bisphenolates in the aqueous phase are not critical to the present invention except that the agueous phase bisphenolate reactant prepared from the bisphenol described in formula (IV) hereinabove and the aqueous phase bisphenolate reactant prepared from the bisphenol described in formula (VI) hereinabove should be present in an amount sufficient to form the polycarbonates of the present invention. The aqueous phase bisphenolate reactant prepared from the bisphenol described in formula (IV) hereinabove and the aqueous phase bisphenolate reactant prepared from the bisphenol described in formula (VI) hereinabove generally should be present in stoichiometric amounts with the organic phase dihaloformate reactant described in formula (III) hereinabove and the organic phase dihaloformate reactant described in formula (V) hereinabove respectively. Other materials which do not adversely affect the polymerization reaction may be present in the aqueous phase in addition to the bisphenolates and excess base, such as antioxidants, foam depressants, catalysts and chain stoppers.

The processes for making the polycarbonates, whether by solution polymerization or by interfacial polymerization, may be carried out at ambient temperature conditions, such as typical room temperature conditions, i.e. 23°–25° C. Higher and lower temperatures may be employed, taking into consideration the problems of stabilizing an interfacial polymerization at temperatures above or below ambient temperatures. The solution process allows the use of a wide temperature range, no particular temperature being absolutely critical to the practice of the process of the invention. Pressure is not critical and so superatmospheric or subatmospheric pressures can be used as well as atmospheric pressure. Reaction time can vary from minutes to as long as several hours.

The dihaloformate reactant described in formula (III) hereinabove and the dihaloformate reactant described in formula (V) hereinabove can be prepared by reacting a bisphenol compound with a carbonyl halide. For example,
2,2-bis-(4-hydroxyphenyl) propane (Bisphenol A) or bis-(3,5-dimethyl-4-hydroxyphenyl) sulfone (TMBS) is mixed with an organic solvent such as toluene, and a carbonyl halide such as phosgene is introduced into the mixture at about room temperature. An acid acceptor such as dimethylaniline is used to accept the by-product hydrogen chloride. An exotherm of from about 2° C. to about 10° C. may be noticed after the initial phosgene addition. Phosgene is added in an amount sufficient to ensure complete reaction of Bisphenol A or TMBS. Product recovery can be achieved by processes well known in the art such as recrystallization.

Suitable bisphenol compounds other than bis-(3,5-dimethyl-4-hydroxyphenyl)sulfone (TMBS) described in formula (VI) hereinabove and which can be reacted with a carbonyl halide to give the dihaloformate reactant described in formula (III) hereinabove, in addition to
2,2-bis-(4-hydroxyphenyl) propane (Bisphenol A) and bis-(4-hydroxyphenyl) sulfone, include hydroquinone, bis-(4-hydroxyphenyl) methane,
2,2-bis-(4-hydroxy-3-methylphenyl) propane,
4,4-bis-(4-hydroxyphenyl) heptane,
2,2-bis-(3,5-dibromo-4-hydroxyphenyl) propane,
2,2-bis-(3,5-dibromo-4-hydroxyphenyl) propane, and
bis-(3-chloro-4-hydroxyphenyl) methane. Other bisphenol compounds are also available and are disclosed in U.S. Pat. Nos. 2,999,835, 3,028,835 and 3,334,154.

Suitable carbonyl halides which can be reacted with the bisphenol compounds to give the dihaloformate reactant described in formula (III) hereinabove and the dihaloformate reactant described in formula (V) hereinabove include carbonyl bromide, carbonyl chloride (phosgene), carbonyl fluoride and the like including mixtures thereof. Carbonyl chloride (phosgene) is preferred.

The bisphenol reactant bis-(3,5-dimethyl-4-hydroxyphenyl)sulfone (TMBS) described in formula (IV) hereinabove can be prepared according to the process described in U.S. Pat. No. 3,383,421. TMBS can also be reacted with a carbonyl halide to give the dihaloformate reactant described in formula (V) hereinabove.

The reaction between the reactants described in formulas (III) and (IV) hereinabove and between the reactants described in formulas (V) and (VI) hereinabove proceeds on a stoichiometric basis such that the desired polycarbonate polymer is formed of the desired molecular weight having enhanced hydrolytic stability and also excellent processability in molding applications. In general, the polycarbonate polymers of this invention containing the greater weight percentages of the ordered, alternating repeating units described hereinabove will preferably have the better hydrolytic stability and better processability.

The improved hydrolytic stability is attributable to the molecular configuration of the ordered, alternating repeating units in which the four methyl groups attached to the aromatic rings of subunit (II) act to sterically hinder hydrolytic attack against the carbonyl-ether oxygen linkages vicinally positioned in the polymer chain. As hydrolytic stability can be enhanced by even minor amounts of the ordered, alternating repeating units, the concentration of ordered, alternating repeating units in the polycarbonates of this invention is not narrowly critical and can be varied over a wide range. The only requirement is that the polycarbonates of this invention contain a sufficient amount of the ordered, alternating repeating units to enhance hydrolytic stability thereof.

In particular, the polycarbonates of this invention preferably contain at least about 50 weight percent, more preferably about 75 weight percent, and most preferably about 90 weight percent, of the ordered, alternating repeating units having the formula

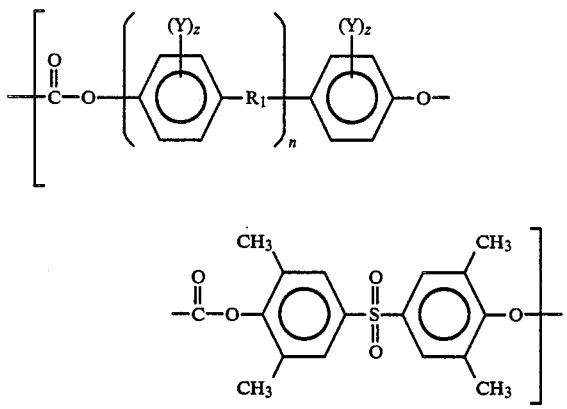

wherein Y, z, n and $R_1$ are as described above and wherein the polycarbonate has a reduced viscosity of at least about 0.3 dl/g as measured in chloroform at a concentration of 0 5 g/100 ml at 25° C. In general, those polycarbonates containing the greater weight percentages of ordered, alternating repeating units will preferably have the better hydrolytic stability and also better processability in molding applications.

The structure of the polycarbonate polymers of this invention can be modified to some extent by including in the polymerization reaction other dihydroxy compounds, typically not more than about 10 weight percent of the total weight of the polycarbonate. For example, one might include along with Bisphenol-A and bis-(3,5-dimethyl-4-hydroxyphenyl)sulfone (TMBS), other dihydroxy compounds either as such or in the haloformate form, as a partial substitute and modifier of the polymeric structure, without adversely affecting the overall properties of the polymeric structure of this invention. For example, such dihydroxy compounds as ethylene glycol, propylene glycol, 1,4-butylene glycol, neopentyl glycol and the like can be included in the polymerization reactions to manufacture the polycarbonate polymers of this invention.

Polymer recovery can be achieved by processes well known in the art to recover a moldable polycarbonate such as by coagulation and filtration.

In addition, the polycarbonates of this invention exhibit excellent compatibility with polyethersulfones such as those which are described in U.S. Pat. No. 3,264,536 and U.S. Pat. No. 4,175,175, as well as with other poly(arylether)s, poly(esther-carbonate)s, polyesters, polyarylates, poly(ether imide)s, styrenic polymers, vinyl chloride containing polymers and the like. In some instances, it may be desirable to blend the polycarbonates of this invention with other polymers exhibiting mechanical compatibility with the polycarbonate polymers. Mechanical compatibility refers to a balance of mechanical properties, e.g., strength, toughness and the like, in miscible blend systems which is generally an average of the mechanical properties of the particular blend constituents. Such moldable and compatible blends may typically contain from about 5 weight percent to about 95 weight percent of the polycarbonates of this invention and from about 95 weight percent to about 5 weight percent of a polymer exhibiting mechanical compatibility with the polycarbonate. The weight percent ratio of the polymers may vary widely depending upon the properties sought from the molded products made from the blend.

Blending may be done in the usual fashion, such as by simple mixing of powders of the polymers though usually in an extruder mixer. The extruded product will typically be a melt mixture of the polycarbonate and the polymer blended therewith. Such as extruded product can be pelleted and used as such in making molded articles of commerce.

The polycarbonates of this invention utilized in manufacturing molded articles may be optionally used with other ingredients such as stabilizers, i.e., metal oxides such as zinc oxide, antioxidants, flame retardants, pigments, and the like. The polycarbonates may be optionally used with reinforcing fibers and/or inorganic fillers. The reinforcing fibers include fiberglass, carbon fibers, and the like, and mixtures thereof. The carbon fibers include those having a high Young's modulus of elasticity and high tensile strength. These carbon fibers may be produced from pitch, as described in U.S. Pat. Nos. 3,976,729; 4,005,183 and 4,026,788, for example. The particulate inorganic fillers which may be used include wollastonite, calcium carbonate, glass beads, talc, mica, clay, quartz and the like, or mixtures thereof.

The fiber reinforcement, filler or combinations thereof, can be utilized in amounts of from 0 to about 50 weight percent, preferably from about 10 to about 35 weight percent, of the total weight of the molded article.

The polycarbonates of this invention utilized in manufacturing molded articles in combination with one or more other ingredients can be prepared by any conventional mixing methods. For example, the polycarbonates and other optional ingredients in powder or granular form can be blended in an extruder and the mixture can be extruded into strands and the strands can be chopped into pellets. The pellets can then be molded into the desired article by conventional techniques such as compression molding, thermoforming, blow molding and injection molding.

The molecular weight of these polycarbonate polymers is indicated by reduced viscosity data in the indicated solvents. As well understood in the art, the viscosity of a resin solution bears a direct relationship to the weight average molecular size of the polymer chains, and is typically the most important single property that can be used to characterize the degree of polymerization. The reduced viscosity assigned to the polymers of this invention is therefore to be understood as significant in reflecting molecular weight rather than consideration concerning the viscosity per se. Most of these polycarbonate polymers indicated are readily soluble in N-methylpyrrolidinone, chloroform, or tetrachloroethane or other similar solvents.

Reduced viscosity (R.V.) as used herein was determined by dissolving a 0.2 or 0.5 gram sample of polycarbonate polymer in the indicated solvent, i.e., chloroform, contained in a 100 milliliter volumetric flask so that the resultant solution measured exactly 100 milliliters at 25° C. in a constant temperature bath. The viscosity of 3 milliliters of the solution which had been filtered through a sintered glass funnel was determined in an Ostwald or similar type viscometer at 25° C. Reduced visoosity values Were obtained from the equation:

$$\text{Reduced Viscosity} = \frac{t_s - t_o}{C \cdot t_o}$$

wherein:

$t_o$ is the efflux time of the pure solvent;
$t_s$ is the efflux time of the polymer solution; and
C is the concentration of the polymer solution expressed in terms of grams of polymer per 100 milliliters of solution.

The polycarbonates of this invention are characterized as linear thermoplastic structures which have a relatively high molecular weight, that is, a reduced viscosity determined at a concentration of 0.5 g/100 ml in chloroform at 25° C. of at least 0.3 dl/g, preferably at least 0.5 dl/g and, typically not exceeding about 1.5 dl/g. These polymers are exceptionally tough and possess superior hydrolytic stability in comparison with conventional polycarbonates of the prior art prepared by phosgenation reactions. The polycarbonates of this invention also exhibit excellent processability in molding applications.

Although this invention has been described with respect to a number of details, it is not intended that this invention should be limited thereby. The examples which follow are intended solely to illustrate the embodiments of this invention which to date have been determined and are not intended in any way to limit the scope and intent of this invention.

COMPARATIVE EXAMPLE A

Preparation of Bisphenol A/TMBS Copolycarbonate by Phosgenation in Pyridine

To a 4-necked one liter flask fitted with a nitrogen/-phosgene sparger (coarse), thermometer, reflux condenser, mechanical stirrer and a 20% sodium hydroxide trap was added 38.25 grams (0.125 moles) of bis-(3,5-dimethyl-4-hydroxyphenyl)sulfone TMBS), 28.55 grams (0.125 moles) of 2,2-bis-(4-hydroxyphenyl)propane (Bisphenol A), 500 milliliters of dichloromethane, and 125 milliliters of pyridine.

After initial sparging with nitrogen for 15 minutes, the phosgene was turned on and the nitrogen turned off. The phosgene was added at an approximate rate of 0.2 grams per minute at room temperature for 2½ hours. A total of about 34 grams of phosgene was added. Excess phosgene was removed with a nitrogen sparge. The polymer was diluted with 200 milliliters of dichloromethane and filtered to remove the pyridine hydrochloride. The solution was washed several times with 5% hydrochloric acid and 0.25% acetic acid solution and then several times with distilled water. The mixture was then coagulated in 50/50 acetone/methanol, filtered, and washed with methanol. The polymer was dried overnight under vacuum and 50° C. The polymer had the following overall composition, but was random in the arrangement of the two types of repeat units.

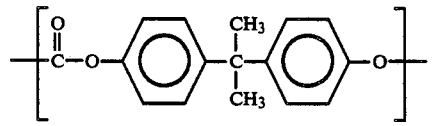

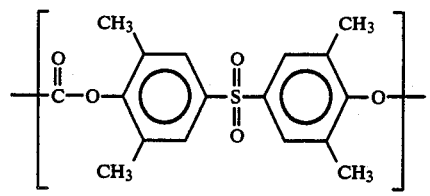

as determined by Carbon-13 and proton-1 Nuclear Magnetic Resonance (NMR) spectroscopic analysis. The reduced viscosity of the polymer at 25° C. in 0.5% chloroform solution was 1.0.

COMPARATIVE EXAMPLE B

Preparation of Bisphenol A/TMBS Copolycarbonate by Phosgenation in Pyridine

To a 4-necked one liter flask fitted with a nitrogen/-phosgene sparger (coarse), thermometer, reflux condenser, mechanical stirrer and a 15% sodium hydroxide trap was added 61.20 grams (0.20 moles) of bis (3,5-dimethyl-4-hydroxyphenyl)sulfone TMBS), 45.66 grams (0.20 moles) of 2,2-bis-(4-hydroxyphenyl)propane (Bisphenol A), 500 milliliters of dichloromethane, and 150 milliliters of pyridine.

After initial sparging with nitrogen for 15 minutes, the phosgene was turned on and the nitrogen turned off. The phosgene was added at an approximate rate of 0.2 grams per minute at room temperature for over 4 hours. A total of about 54 grams of phosgene was added. Excess phosgene was removed with a nitrogen sparge. The phosgene addition was stopped when the polymer solution color changed from green to brown. The viscous polymer was diluted with 600 milliliters of dichloromethane and then poured into an acidified ice bath containing 100 milliliters of concentrated hydrochloric acid to neutralize the pyridine. The solution was washed with equal volumes of 0.1N hydrochloric acid, a saturated sodium chloride solution and distilled water. The solution was then diluted to 1700 milliliters with dichloromethane and coagulated in methanol (dichloromethane/methanol volume ratio was 1/5) to give 107.8 grams of a very fibrous polymer. The polymer had the following overall composition, but was random in the arrangement of the two types of repeat units,

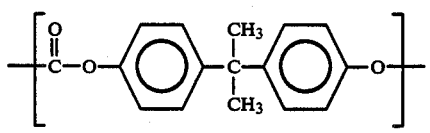

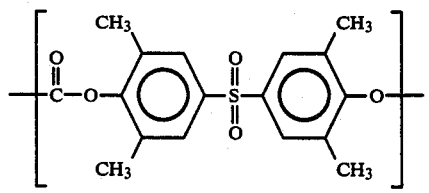

as determined by Carbon-13 and proton-1 Nuclear Magnetic Resonance (NMR) spectroscopic analysis, and the reduced viscosity of the polymer at 25° C. in 0.5% chloroform solution was 1.85.

EXAMPLE 1

Part A. Preparation of Bisphenol A Dichloroformate

To a 4-necked one liter flask fitted with a nitrogen/phosgene sparger (coarse), thermometer, dry ice condenser, 125 milliliter pressure equilibrated addition funnel, magnetic stirrer and a 15% sodium hydroxide trap was added 57.0 grams (0.25 moles) of 2,2-bis-(4-hydroxyphenyl)propane (Bisphenol A) and 400 milliliters of toluene. To the 125 milliliter pressure equilibrated addition funnel was added 63.5 grams (0.525 moles) of dimethylaniline diluted in 64 grams of toluene. A stopcock on the arm of the addition funnel was closed to prevent phosgene from reacting with the dimethylaniline.

After initial sparging with nitrogen for 15 minutes, the phosgene was turned on and the nitrogen turned off. The phosgene was added over a 1.5 hour period until about 66 grams (0.67 moles) of phosgene were added to the toluene/Bisphenol A mixture. The dimethylaniline was then added as rapidly as possible to the mixture. After the initial phosgene addition, the reaction mixture exothermed from a temperature of 23° C. to 26° C. and then further increased to a temperature of 30° C. over a one hour period. The reaction was carried out at a temperature of from 26° C.–30° C. for a total period of 3 hours after the initial phosgene addition. Additional phosgene was continuously added to the reaction mixture to compensate for any leaks in the system and to ensure complete reaction of the Bisphenol A. The total phosgene added was 132.5 grams (1.34 moles).

The large excess of phosgene was eliminated by nitrogen sparging for 24 hours after diluting the mixture with 200 milliliters of toluene. The dimethylaniline hydrochloride was filtered and the salt washed twice with a minimum volume of toluene. The combined dark solution was treated for one hour with 50 grams of silica gel 953 to yield a bright yellow clear solution which, after removal of toluene on a rotary evaporator at 70° C., yielded 96.1 grams of a yellow solid. Recrystallization from about 4 parts hexane to one part yellow solid and cooling overnight at 4.5° C. yielded 74 grams of white crystals having a melting point of 89° C.–90° C. and having the following formula

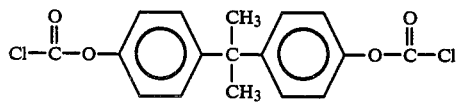

NMR analysis indicated that a pure material was obtained.

Part B. Preparation of Ordered, Alternating Bisphenol A/TMBS Copolycarbonate From Bisphenol A Dichloroformate To a 4-necked two liter flask fitted with a thermometer, nitrogen inlet port, mechanical stirrer. Claisen head 1000 milliliter addition funnel and reflux condenser was added 20 grams (0.25 moles) of 50% sodium hydroxide, 750 milliliters of distilled water and 30.63 grams (0.1 mole) of bis(3,5-dimethyl-4-hydroxyphenyl)sulfone (TMBS) with continuous stirring. To this solution was added 35.32 grams (0.1 mole) of Bisphenol A dichloroformate (prepared in part A) dissolved in 500 milliliters of dichloromethane with ice cooling to keep the temperature at 25° C. The reaction mixture was stirred for 5 minutes after which 2 milliliters of triethylamine were added with ice cooling to keep the temperature at 25° C. The reaction mixture was thereafter stirred for a period of 3.5 hours at a temperature of 25° C. At the end of the 3.5 hour reaction period, coagulation in methanol of a small sample indicated a high molecular weight. The reaction mixture was washed with hydrochloric acid and distilled water and then coagulated in methanol. The polymer had the following ordered, alternating structural formula

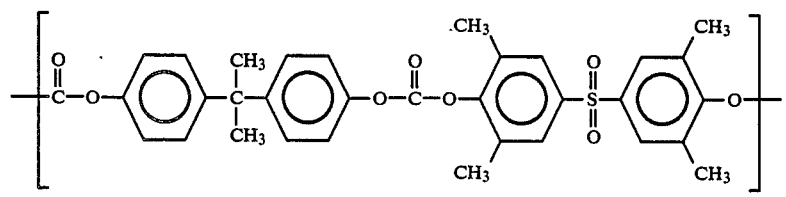

as determined by Carbon-13 and proton-1 Nuclear Magnetic Resonance (NMR) spectroscopic analysis, and the reduced viscosity of the polymer at 25° C. in 0.5% chloroform solution was 1.12.

COMPARATIVE EXAMPLE C

A sample of Bisphenol A polycarbonate (commercially available from the General Electric Company, Pittsfield, Mass. as Lexan 101) was compression molded into a plaque in a 4 inch×4 inch×0.020 inch cavity mold at 300° C. using a South Bend hydraulic press with heated platens. The reduced viscosity of the polymer composition of the plaque was determined and, after placing the plaque in boiling distilled water, the reduced viscosity of the polymer composition of the plaque was again determined at various periods of time (boiling distilled water immersion) as specified in Table A herein below. All reduced viscosity values in Table A were determined at a temperature of 25° C. in a 0.2% chloroform solution. The results in Table A indicate the ratio of the reduced viscosity of the polymer composition at the specified time to the initial reduced viscosity of the polymer composition determined before placing the plaque in boiling water.

COMPARATIVE EXAMPLE D

A sample of the Bisphenol A/TMBS copolycarbonate prepared in Comparative Example A by phosgenation in pyridine was compression molded into a plaque in a 4 inch×4 inch×0.020 inch cavity mold at 300° C. using a South Bend hydraulic press with heated platens. The reduced viscosity of the polymer composition of the plaque was determined and, after placing the plaque in boiling distilled water, the reduced viscosity of the polymer composition of the plaque was again determined at various periods of time (boiling distilled water immersion) as specified in Table A. All reduced viscosity values in Table A were determined at a temperature of 25° C. in a 0.2% chloroform solution. The results in Table A indicate the ratio of the reduced viscosity of the polymer composition at the specified time to the initial reduced viscosity of the polymer composition determined before placing the plaque in boiling water.

COMPARATIVE EXAMPLE E

A sample of the Bisphenol A/TMBS copolycarbonate prepared in Comparative Example B by phosgenation in pyridine was compression molded into a plaque in a 4 inch×4 inch×0.020 inch cavity mold at 300° C. using a South Bend hydraulic press with heated platens. The reduced viscosity of the polymer composition of the plaque was determined and, after placing the plaque in boiling distilled water, the reduced viscosity of the polymer composition of the plaque was again determined at various periods of time (boiling distilled water immersion) as specified in Table A. All reduced viscosity values in Table A were determined at a temperature of 25° C. in a 0.2% chloroform solution. The results in Table A indicate the ratio of the reduced viscosity of the polymer composition at the specified time to the initial reduced viscosity of the polymer composition determined before placing the plaque in boiling water.

EXAMPLE 2

A sample of the ordered, alternating Bisphenol A/TMBS copolycarbonate prepared in Example 1 from Bisphenol A dichloroformate was compression molded into a plaque in a 4 inch×4 inch×0.020 inch cavity mold at 300° C. using a South Bend hydraulic press with heated platens. The reduced viscosity of the polymer composition of the plaque was determined and, after placing the plaque in boiling distilled water, the reduced viscosity of the polymer composition of the plaque was again determined at various periods of time (boiling distilled water immersion) as specified in Table A. All reduced viscosity values in Table A were determined at a temperature of 25° C. in a 0.2% chloroform solution. The results in Table A indicate the ratio of the reduced viscosity of the polymer composition at the specified time to the initial reduced viscosity of the polymer composition determined before placing the plaque in boiling water.

TABLE A

| Plaque Sample Identification | Ratio of Reduced Viscosity at Indicated Time to Initial Reduced Viscosity as a Function of Time in Boiling Distilled Water | | | | | |
|---|---|---|---|---|---|---|
| | Boiling Distilled Water Immersion (Hrs) | | | | | |
| | 0 | 100 | 138.5 | 307.5 | 316 | 499.5 |
| Comp. Ex. C | 1 | 0.68 | — | — | 0.56 | — |
| Comp. Ex. D | 1 | 0.73 | — | — | 0.57 | — |
| Comp. Ex. E | 1 | — | 0.71 | 0.60 | — | 0.53 |
| Example 2 | 1 | — | 0.82 | 0.77 | — | 0.69 |

Table A illustrates that the reduced viscosities of the polymer compositions of the plaques prepared in Comparative Example C (control Bisphenol A polycarbonate), D (Bisphenol A/TMBS copolycarbonate made by phosgenation in pyridine) and E (Bisphenol A/TMBS copolycarbonate made by phosgenation in pyridine) decrease much more rapidly upon prolonged exposure in boiling distilled water than the reduced viscosity of the polymer composition of the plaque prepared in Example 2 (ordered, alternating Bisphenol A/TMBS copolycarbonate made from Bisphenol A dichloroformate) at similar exposure time. The polymer composition of the plaque prepared in Example 2 shows improved hydrolytic stability in comparison With the polymer compositions of the plagues prepared in Comparative Examples C, D and E. As reduced viscosity is an indication of polymer molecular weight, the diohloroformate route to polycarbonates containing TMBS produces a more hydrolytically stable product than the phosgenation route.

We claim:

1. A composition comprising a polycarbonate containing ordered, alternating repeating units having the formula

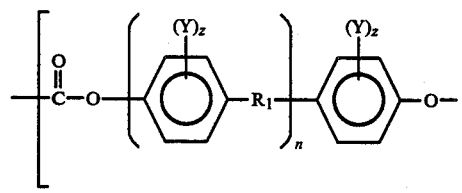

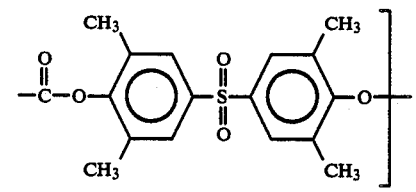

in an amount sufficient to enhance hydrolytic stability of the polycarbonate, wherein Y is selected from alkyl groups of 1 to 4 carbon atoms, chlorine or bromine, each z, independently, has a value of from 0 to 4 inclusive, n has a value of 0 or 1, $R_1$ is a divalent saturated or unsaturated hydrocarbon radical, O, CO, $SO_2$, S or a direct bonds, with the proviso that when $R_1$ is $SO_2$ then the subunit having the formula

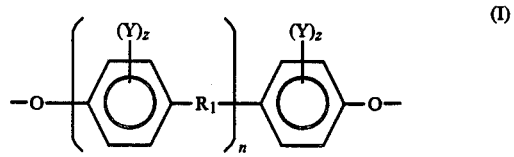

(I)

is not the same as the subunit having the formula

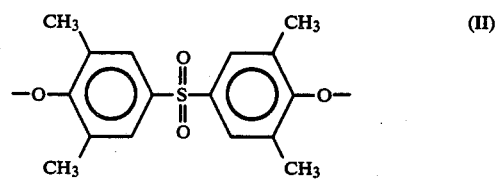

(II)

and wherein the polycarbonate has a reduced viscosity of at least about 0.3 dl/g as measured in chloroform at a concentration of 0.5 g/100 ml at 25° C.

2. A composition as defined in claim 1 wherein the polycarbonate contains ordered, alternating repeating units having the formula

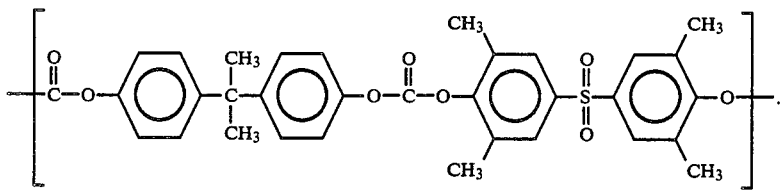

3. A composition as defined in claim 1 wherein the polycarbonate contains ordered, alternating repeating units having the formula

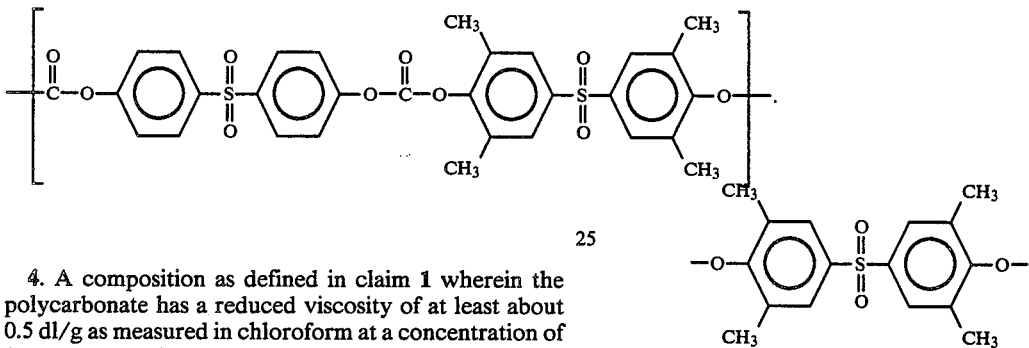

4. A composition as defined in claim 1 wherein the polycarbonate has a reduced viscosity of at least about 0.5 dl/g as measured in chloroform at a concentration of 0.5 g/100 at 25° C.

5. A process for preparing a polycarbonate comprising ordered, alternating repeating units having the formula

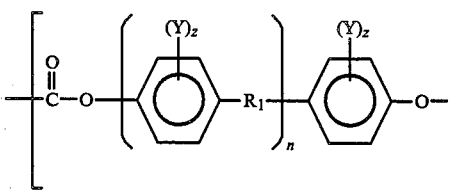

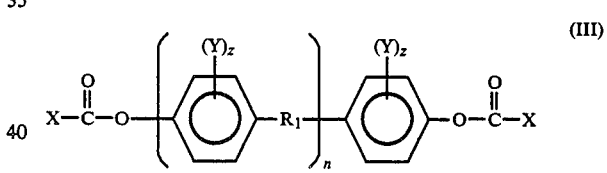

in an amount sufficient to enhance hydrolytic stability of the polycarbonate, wherein Y is selected from alkyl groups of 1 to 4 carbon atoms, chlorine or bromine, each z, independently, has a value of from 0 to 4 inclusive, n has a value of 0 or 1, $R_1$ is a divalent saturated or unsaturated hydrocarbon radical, O, CO, $SO_2$, S or a direct bond, with the proviso that when $R_1$ is $SO_2$ then the subunit having the formula (I)

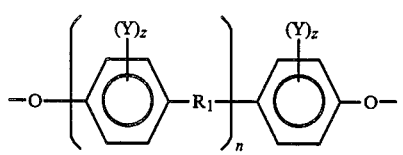

is not the same as the subunit having the formula (II)

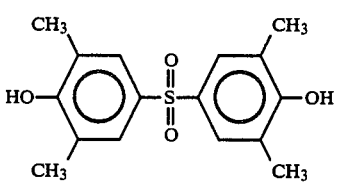

and wherein the polycarbonate has a reduced viscosity of at least about 0.3 dl/g as measured in chloroform at a concentration of 0.5 g/100 ml at 25° C., which process comprises reacting a compound having the formula (III)

wherein Y, z, n and $R_1$ are as defined above and X is halogen, and a bisphenol compound having the formula (IV)

in amounts sufficient to form the polycarbonate.

6. A process as defined in claim 5 wherein the compound having the formula (III) is Bisphenol A dichloroformate.

7. A process as defined in claim 5 wherein the compound having the formula (III) is Bisphenol S dichloroformate.

8. A polycarbonate prepared according to the process of claim 5.

9. A molded article prepared from the polycarbonate of claim 8.

10. A process for preparing a polycarbonate comprising ordered, alternating repeating units having the formula

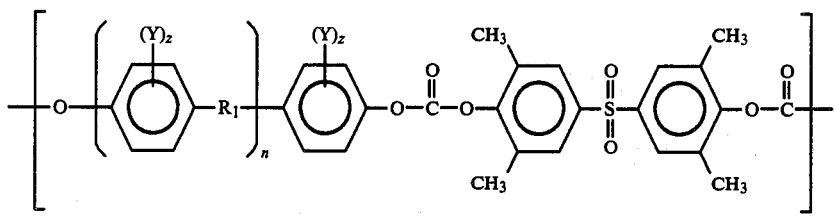

in an amount sufficient to enhance hydrolytic stability of the polycarbonate, wherein Y is selected from alkyl groups of 1 to 4 carbon atoms, chlorine or bromine, each z, independently, has a value of from 0 to 4 inclusive, n has a value of 0 or 1, $R_1$ is a divalent saturated or unsaturated hydrocarbon radical, O, CO, $SO_2$, S or a direct bond, with the proviso that when $R_1$ is $SO_2$ then the subunit having the formula

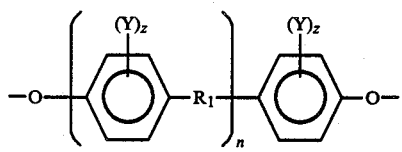 (I)

is not the same as the subunit having the formula

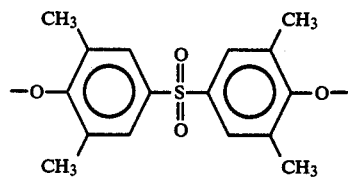 (II)

and wherein the polycarbonate has a reduced viscosity of at least about 0.3 dl/g as measured in chloroform at a concentration of 0.5 g/100 ml at 25° C. which process comprises reacting a compound having the formula

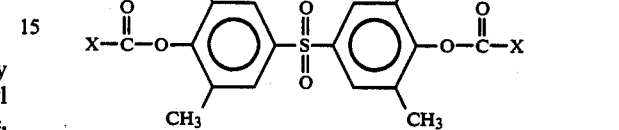 (V)

wherein X is halogen, and a bisphenol compound having the formula

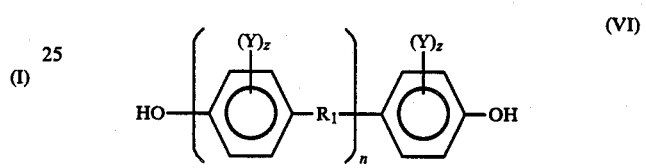 (VI)

wherein Y, z, n and $R_1$ are as defined above, in amounts sufficient to form the polycarbonate.

11. A process as defined in claim 10 wherein the compound having the formula (V) is bis-(3,5-dimethyl-4-hydroxyphenyl)sulfone (TMBS) dichloroformate.

12. A process as defined in claim 10 wherein the compound having the formula (VI) is Bisphenol A.

13. A process as defined in claim 10 wherein the compound having the formula (VI) is Bisphenol S.

14. A polycarbonate prepared according to the process of claim 10.

15. A molded article prepared from the polycarbonate of claim 14.

16. A molded article prepared from the composition of claim 1.

* * * * *